(12) United States Patent
Koch et al.

(10) Patent No.: US 8,205,448 B2
(45) Date of Patent: Jun. 26, 2012

(54) TURBOCHARGER WITH IMPROVED CHARGE PRESSURE REGULATING FLAP CONFIGURATION

(75) Inventors: Silvio Koch, Kirchheimbolanden (DE); Thomas Koerner, Recklinghausen (DE); Rainer Wickert, Schoenborn (DE)

(73) Assignee: BorgWarner Inc., Auburn Hills, MI (US)

( * ) Notice: Subject to any disclaimer, the term of this patent is extended or adjusted under 35 U.S.C. 154(b) by 435 days.

(21) Appl. No.: 12/517,441

(22) PCT Filed: Oct. 23, 2007

(86) PCT No.: PCT/EP2007/009194
§ 371 (c)(1),
(2), (4) Date: Jun. 3, 2009

(87) PCT Pub. No.: WO2008/071254
PCT Pub. Date: Jun. 19, 2008

(65) Prior Publication Data
US 2010/0083654 A1 Apr. 8, 2010

(30) Foreign Application Priority Data
Dec. 11, 2006 (DE) .......................... 10 2006 058 341

(51) Int. Cl.
*F02D 23/00* (2006.01)
*F16K 1/16* (2006.01)
(52) U.S. Cl. ........................... 60/602; 251/298; 251/356

(58) Field of Classification Search ................ 251/298, 251/356; 60/602
See application file for complete search history.

(56) References Cited

U.S. PATENT DOCUMENTS

| 2,717,001 A | * | 9/1955 | Perrault ...................... 137/514 |
| 3,963,211 A | * | 6/1976 | Myers ........................... 251/85 |
| 4,719,757 A | | 1/1988 | Nakazawa et al. |
| 6,976,359 B2 | * | 12/2005 | Hastings et al. ............... 60/602 |

FOREIGN PATENT DOCUMENTS

| DE | 1151673 B | 7/1963 |
| GB | 960110 A | 6/1964 |
| JP | 61207829 A | 9/1986 |
| JP | 4272430 A | 9/1992 |
| WO | 2007103860 A2 | 9/2007 |

OTHER PUBLICATIONS

STIC—Translation, JP 04-272430, Oct. 3, 2011.*

* cited by examiner

*Primary Examiner* — Quyen Leung
*Assistant Examiner* — Thomas Truong
(74) *Attorney, Agent, or Firm* — William G. Anderson; Stephan A. Pendorf; Patent Central LLC

(57) ABSTRACT

The invention relates to a turbocharger (1) comprising a compressor (2), a turbine connected to the compressor (2) by means of a shaft (3) and provided with an exhaust inlet (5) and an exhaust outlet (7), and a bypass line (6) which branches off from the exhaust inlet (5), bypassing the turbine, and leads to the exhaust outlet in which a boost-pressure regulating flap is arranged, said regulating flap comprising a flap plate (13) which is connected to a flap shaft (14) by means of a connecting device (12).

5 Claims, 3 Drawing Sheets

TURBOCHARGER WITH IMPROVED CHARGE PRESSURE REGULATING FLAP CONFIGURATION

The invention relates to a turbocharger.

A turbocharger of said type is known from EP 1 626 212 A1. The turbocharger in said document has a regulating flap which is arranged in the exhaust-gas bypass line for regulating the charge pressure. On account of its geometry, said regulating flap is suitable only for small flap diameters or mass flow rates. Said geometry is firstly characterized in that the rotational axis of the flap shaft does not lie in the sealing plane of the flap, but rather is offset with respect thereto, and secondly by a cylindrical connecting device between the lever and flap plate. Under load, the contact point between the flap plate and the lever moves away from the theoretical center as a result of an inclination of the flap shaft on account of the bearing play, and generates an eccentrically acting pressure force on the plate. Depending on the magnitude of the play of the lever/flap plate connecting device, this can result in the flap plate being subjected to a non-uniform pressure force over its periphery, or in the flap plate not coming completely into contact with the sealing seat, which results in significantly increased leakage. Said problem cannot be solved by increasing the play of the connecting device, since this increases the relative movement of the flap plate shortly before it abuts against the sealing seat, which leads to increased wear and therefore increased leakage during operation.

In contrast, it is an object of the present invention to create a turbocharger, the charge pressure regulating flap of which permits a considerable reduction in the leakage quantity in the new state and maintains said reduction during operation as a result of a small amount of wear.

A turbocharger as described herein can achieve this object. The turbocharger (1) has a compressor (2) and a turbine (4). The turbine (4) is connected to the compressor (2) by means of a shaft (3). The turbine (4) has an exhauast-gas inlet (5) and an exhuaust-gas outlet (7). The turbocharger (1) has a bypass line (6) which branches off from the exhaust-gas inlet (5) so as to bypass the turbine (4) and leads to the exhaust-gas outlet (7). A charge pressure regulating flap (16) is arranged in the bypass line (6). The charge pressure regulating flap (16) has a flap plate (13) which is connected by means of a connecting device (12) to a flap shaft (14). The central axis (20) of the flap shaft (14) lies substantially in a common plane with the sealing plane (19) of the flap plate (13). In one embodiment, the connecting device (12) has a conical contact surface (17), which is operatively connected to a curved mating surface (18). In another embodiment, the connecting device (12) has a curved contact surface (17), which is operatively connected to a curved mating surface (18).

The turbocharger may have additional advantageous features. For instance, when the connecting device (12) has a conical contact surface (17), the conical contact surface (17) can be arranged on a lever (22) of the flap shaft (14) and the curved mating surface (18) can be arranged on the flap plate (13). Alternatively, when the connecting device (12) has a conical contact surface (17), the conical contact surface (17) can be arranged on the flap plate (13) and the curved mating surface (18) can be arranged on a lever (22) of the flap shaft (6).

Further details, advantages and features of the invention can be gathered from the following description of an exemplary embodiment on the basis of the drawing, in which:

FIG. 1 shows a schematically highly simplified illustration of the turbocharger 1 according to the invention.

Figure 1:
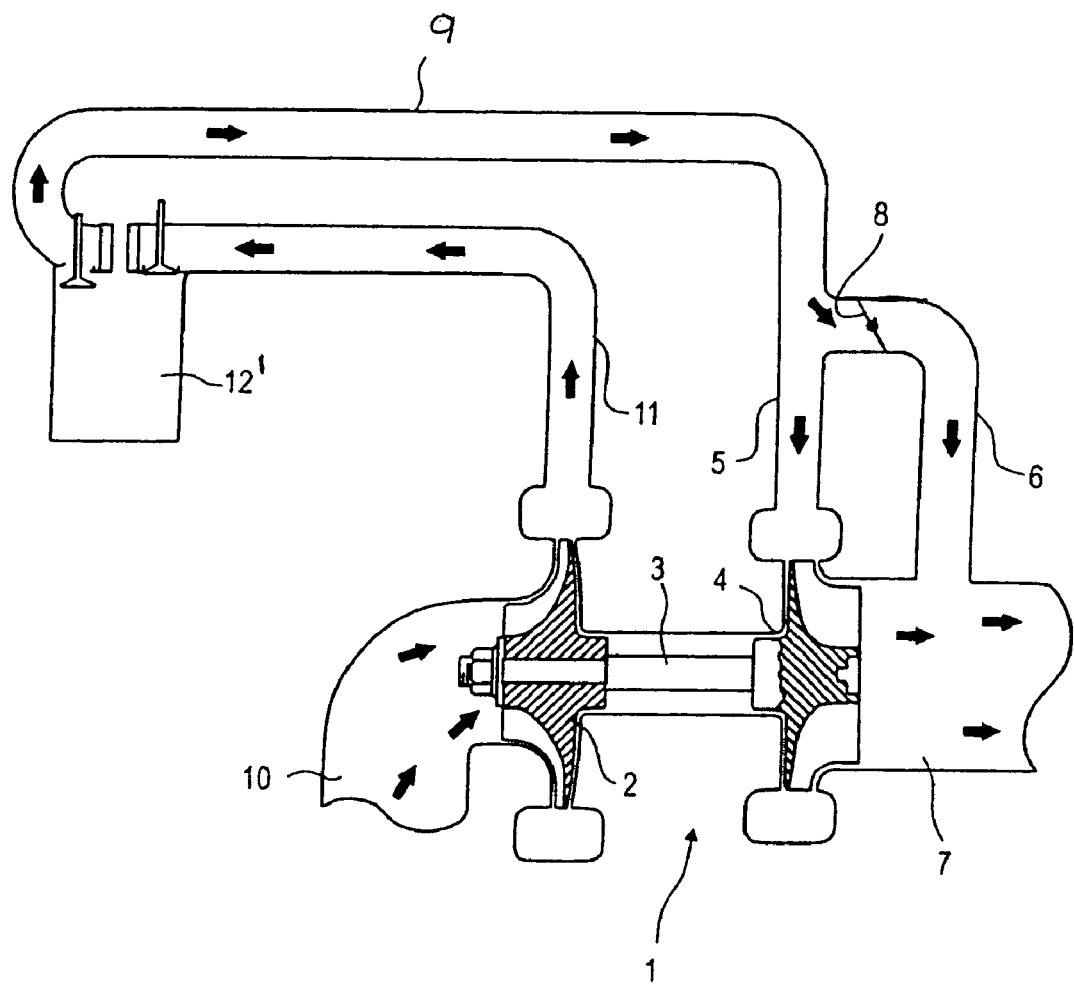
FIG. 1 shows a schematically highly simplified illustration of the turbocharger according to the invention.

The turbocharger 1 has a compressor 2, the compressor wheel of which is connected by means of a shaft 3 to a turbine wheel of a turbine 4. The turbine 4 has an exhaust-gas inlet 5 which is connected to an exhaust line 9 of an internal combustion engine.

The turbine 4 also has an exhaust-gas outlet 7.

FIG. 1 also shows a bypass line 6 which branches off from the exhaust-gas inlet 5 upstream of the turbine inlet and leads directly to the exhaust-gas outlet 7, such that the turbine 4 is bypassed by said bypass line 6.

A blocking element 8 is arranged in the bypass line 6, which blocking element 8 may for example be designed as a so-called "wastegate". The blocking element 8 has a charge pressure regulating flap 16 designed according to the invention, which is described in detail below on the basis of different embodiments.

FIG. 1 also shows, for completeness, an air inlet 10 into the compressor 2 and an air outlet 11 out of the compressor 2, which air outlet 11 conducts the air which is compressed by the compressor 2 to the internal combustion engine 12'.

The turbocharger 1 according to FIG. 1 self-evidently has all the other conventional parts, though for simplicity, said parts are not illustrated in FIG. 1 since they are not of significance for the explanation of the invention.

Figure 2:
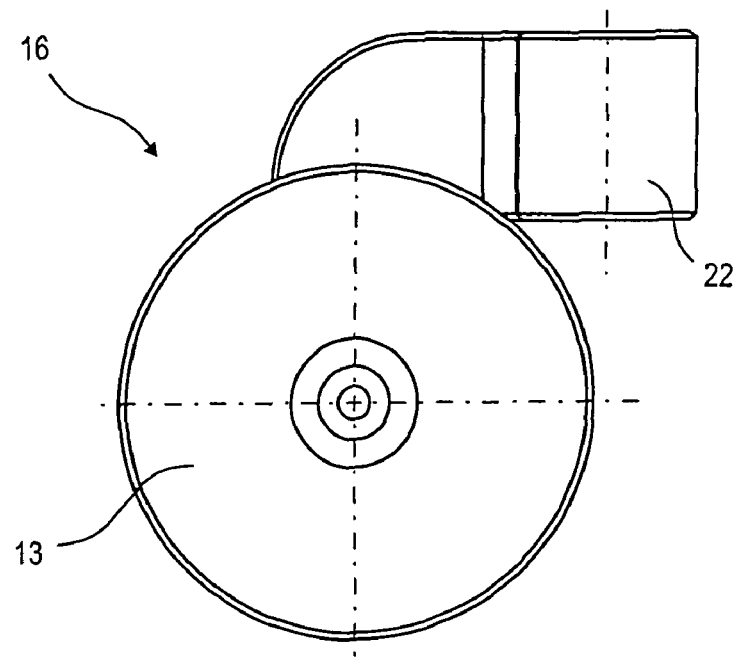
FIG. 2 shows a side view of the regulating flap according to the invention.

FIG. 2 shows a side view of the charge pressure regulating flap 16 according to the invention with a flap plate 13 and a lever 22 of a connecting device 12, which is described in more detail below.

Figure 3:
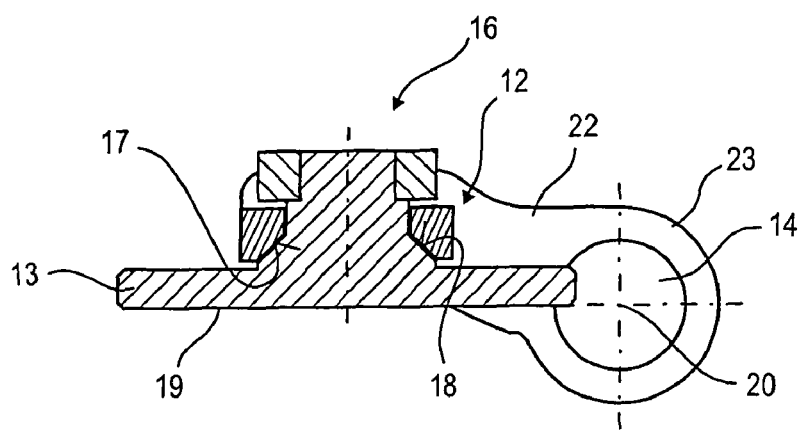
FIG. 3 shows a cross-sectional view of an embodiment of the charge pressure regulating flap.

FIG. 3 shows, in a cross-sectional view, a first embodiment of an overall arrangement of the charge pressure regulating flap 16 according to the invention. In said first embodiment, the flap plate 13 is connected by means of the connecting device 12 to the flap shaft 14. As can be seen from the illustration, the connecting device 12 has the lever 22 which is fastened to the shaft 14 by means of a fastening section 23. The central axis 20 of the shaft 14 lies in a common plane with a sealing plane 19 of the flap plate 13. The connecting device 12 is operatively connected by means of a contact surface 17, which is for example conical, of the lever 22 to a curved, for example spherically rounded mating surface 18 of the flap plate 13.

In a further embodiment of the invention, the contact surface/mating surface pairing of the flap plate 13 and of the lever 22 may also be reversed, that is to say the curved mating surface 18 is formed on the lever 22 and the conical contact surface 17 is formed on the flap plate 13.

By means of said shaping of the contact surface 17/mating surface 18 pairing, encircling contact is ensured between the flap plate 13 and the lever 22 even under load. The theoretical contact point therefore remains in the center of the flap plate 13, and the leakage quantity can thereby be considerably reduced.

Figure 4:
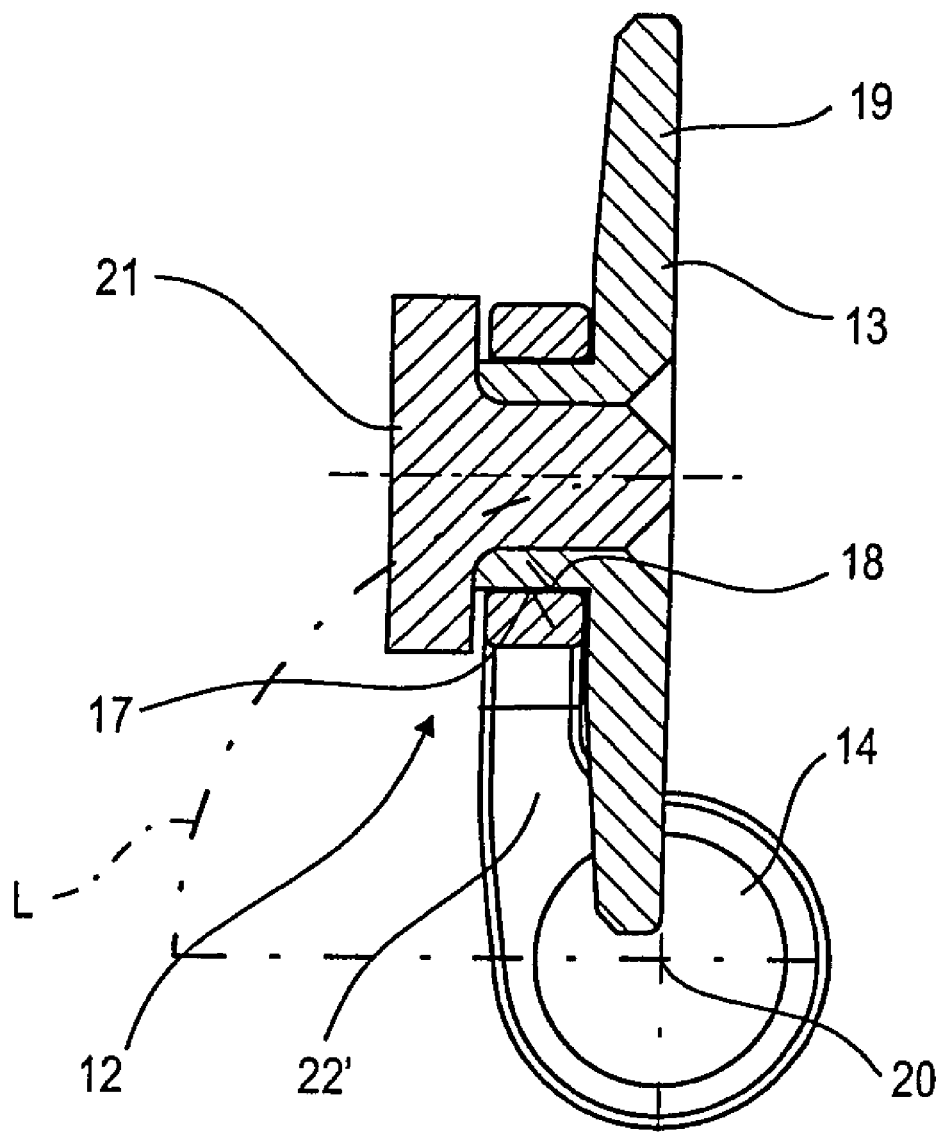
FIG. 4 shows a cross-sectional view of a further embodiment of the charge pressure regulating flap.

FIG. 4 shows a further embodiment of the invention. As can be seen from said illustration, the connecting device 12 here has a modified, cranked lever 22', such that the rotational axis of the flap shaft 14 lies, as before, in a common plane with the sealing surface 19. In said embodiment of the connecting device 12, however, the contact surface 17 is of cylindrical design, and is in operative contact with the likewise cylindrical mating surface 18 of the flap plate 13. A securing bolt 21 is inserted from the rear side into an opening of the flap plate 13. The circular-arc-shaped movement path L of the flap plate 13 is highlighted in the figure by a dash-dotted line. Said movement profile of the flap plate 13 has the result that, at the highest point of its movement path, the flap plate 13 abuts against a sealing seat (not illustrated here) in the turbine housing. Said arrangement serves to ensure, in contrast to conventional designs, that the flap plate 13 cannot perform a relative movement with respect to the sealing seat. This very considerably increases the functional capability and service life of the components.

To complement the written disclosure, reference is explicitly made to the diagrammatic illustration.

| List of reference symbols | |
|---|---|
| 1 | Turbocharger/exhaust-gas turbocharger |
| 2 | Compressor |
| 3 | Shaft |
| 4 | Turbine |
| 5 | Exhaust-gas inlet |
| 6 | Bypass (line) |
| 7 | Exhaust-gas outlet |
| 8 | Blocking element |
| 9 | Exhaust-gas line |
| 10 | Air inlet |
| 11 | Air outlet |
| 12 | Connecting device |
| 12' | Internal combustion engine |
| 13 | Flap plate |
| 14 | Flap shaft |
| 16 | Charge pressure regulating flap |
| 17 | Conical contact surface |
| 18 | Rounded mating surface |
| 19 | Sealing plane |
| 20 | Central axis of the flap shaft |
| 21 | Securing bolts |
| 22, 22' | Levers |
| 23 | Fastening section |

The invention claimed is:

1. A turbocharger (1)
    having a compressor (2),
    having a turbine (4) which is connected to the compressor (2) by means of a shaft (3) and which has an exhaust-gas inlet (5) and an exhaust-gas outlet (7),
    having a bypass line (6) which branches off from the exhaust-gas inlet (5) so as to bypass the turbine (4) and leads to the exhaust-gas outlet (7), and in which is arranged a charge pressure regulating flap (16) which has a flap plate (13) which is connected by means of a connecting device (12) to a flap shaft (14),
    wherein the connecting device (12) has a conical contact surface (17) which is operatively connected to a curved mating surface (18), and
    wherein the central axis (20) of the flap shaft (14) lies substantially in a common plane with the sealing plane (19) of the flap plate (13).

2. The turbocharger (1) as claimed in claim 1, wherein the conical contact surface (17) is arranged on a lever (22) of the flap shaft (14) and the curved mating surface (18) is arranged on the flap plate (13).

3. The turbocharger (1) as claimed in claim 1, wherein the conical contact surface (17) is arranged on the flap plate (13) and the curved mating surface (18) is arranged on a lever (22) of the flap shaft (6).

4. A turbocharger (1)
    having a compressor (2),
    having a turbine (4) which is connected to the compressor (2) by means of a shaft (3) and which has an exhaust-gas inlet (5) and an exhaust-gas outlet (7),
    having a bypass line (6) which branches off from the exhaust-gas inlet (5) so as to bypass the turbine (4) and leads to the exhaust-gas outlet (7), and in which is arranged a charge pressure regulating flap (16) which has a flap plate (13) which is connected by means of a connecting device (12) to a flap shaft (14),
    wherein the connecting device (12) has a curved contact surface (17) which is operatively connected to a curved mating surface (18), and
    wherein the central axis (20) of the flap shaft (14) lies substantially in a common plane with the sealing plane (19) of the flap plate (13).

5. A turbocharger (1)
    having a compressor (2),
    having a turbine (4) which is connected to the compressor (2) by means of a shaft (3) and which has an exhaust-gas inlet (5) and an exhaust-gas outlet (7),
    having a bypass line (6) which branches off from the exhaust-gas inlet (5) so as to bypass the turbine (3) and leads to the exhaust-gas outlet (7), and in which is arranged a charge pressure regulating flap (16) which has a flap plate (13) which is connected by means of a connecting device (12) to a flap shaft (14),
    wherein the connecting device (12) is designed such that the central axis (20) of the flap shaft (14) lies in a common plane with the sealing plane (19) of the flap plate (13).

\* \* \* \* \*